(12) United States Patent
Mori et al.

(10) Patent No.: US 12,194,929 B2
(45) Date of Patent: Jan. 14, 2025

(54) IMAGING DEVICE FOR MOUNTING DEVICE

(71) Applicant: NIFCO INC., Yokosuka (JP)

(72) Inventors: Daisuke Mori, Yokosuka (JP); Takahiro Saito, Yokosuka (JP)

(73) Assignee: NIFCO INC., Yokosuka (JP)

( * ) Notice: Subject to any disclaimer, the term of this patent is extended or adjusted under 35 U.S.C. 154(b) by 133 days.

(21) Appl. No.: 18/016,967

(22) PCT Filed: Jun. 30, 2021

(86) PCT No.: PCT/JP2021/024684
§ 371 (c)(1),
(2) Date: Jan. 19, 2023

(87) PCT Pub. No.: WO2022/019066
PCT Pub. Date: Jan. 27, 2022

(65) Prior Publication Data
US 2023/0280636 A1  Sep. 7, 2023

(30) Foreign Application Priority Data
Jul. 22, 2020 (JP) ................. 2020-125494

(51) Int. Cl.
  *B60R 11/04* (2006.01)
  *B60R 11/00* (2006.01)
  *G03B 11/04* (2021.01)

(52) U.S. Cl.
  CPC ....... *B60R 11/04* (2013.01); *B60R 2011/0026* (2013.01); *G03B 11/04* (2013.01)

(58) Field of Classification Search
  CPC .......................... B60R 11/04; B60R 2011/0026
  See application file for complete search history.

(56) References Cited

U.S. PATENT DOCUMENTS

| | | | |
|---|---|---|---|
| 11,148,612 B2 * | 10/2021 | Ueta | ............ G03B 17/561 |
| 2014/0160284 A1 | 6/2014 | Achenbach et al. | |
| 2015/0042804 A1 | 2/2015 | Okuda | |
| 2015/0251605 A1 | 9/2015 | Uken et al. | |

(Continued)

FOREIGN PATENT DOCUMENTS

| | | |
|---|---|---|
| DE | 102014224860 A1 | 6/2016 |
| JP | 2018-012406 A | 1/2018 |

(Continued)

OTHER PUBLICATIONS

European Patent Office, "Extended European Search Report for European Application No. 21846299.2", Jun. 26, 2024, 8 pp.

(Continued)

*Primary Examiner* — Leon W Rhodes, Jr.
(74) *Attorney, Agent, or Firm* — HAUPTMAN HAM, LLP

(57) ABSTRACT

An imaging device for a mounting device includes a bracket supporting a camera unit having a light receiving unit, and configured to be mounted on an attachment subject, and a hood having a surface expanding in a direction away from the light receiving unit in front of the light receiving unit, and mounted on the bracket so that the surface faces the attachment subject, wherein the hood can be removed from the bracket along the attachment subject while the camera unit is being supported by the bracket.

8 Claims, 7 Drawing Sheets

(56) References Cited

U.S. PATENT DOCUMENTS

| | | | |
|---|---|---|---|
| 2016/0227078 A1 | 8/2016 | Oh | |
| 2016/0375828 A1 | 12/2016 | Yun | |
| 2018/0069993 A1 | 3/2018 | Hart | |
| 2019/0104244 A1 | 4/2019 | Kobayashi et al. | |
| 2019/0308563 A1 | 10/2019 | Fujiwara | |
| 2019/0394365 A1 | 12/2019 | Blake, III et al. | |
| 2020/0191620 A1 | 6/2020 | Kasai et al. | |
| 2020/0192196 A1 | 6/2020 | Kasai et al. | |
| 2020/0262361 A1 | 8/2020 | Ueta et al. | |

FOREIGN PATENT DOCUMENTS

| | | | |
|---|---|---|---|
| JP | 2019-064425 A | 4/2019 | |
| JP | 2019-137289 A | 8/2019 | |
| JP | 2020-097331 A | 6/2020 | |
| JP | 2020-131809 A | 8/2020 | |
| WO | 2016/125965 A1 | 8/2016 | |
| WO | 2019/245661 A1 | 12/2019 | |

OTHER PUBLICATIONS

PCT/ISA/210, "International Search Report for PCT International Application No. PCT/JP2021/024684," Aug. 17, 2021.

\* cited by examiner

US 12,194,929 B2

IMAGING DEVICE FOR MOUNTING DEVICE

RELATED APPLICATIONS

The present application is National Phase of International Application No. PCT/JP2021/024684 filed Jun. 30, 2021, and claims priority from Japanese Application No. 2020-125494, filed Jul. 22, 2020, the disclosure of which is hereby incorporated by reference herein in its entirety.

TECHNICAL FIELD

The present disclosure relates to an imaging device for a mounting device provided for an imaging device mounted, for example, on a window glass of a vehicle.

BACKGROUND ART

An imaging device for a vehicle is mounted on a surface, of a pair of surfaces having a windshield glass, that is one example of a window glass, inside a vehicle cabin. An imaging device is used to detect the presence or absence of another vehicle or an obstacle positioned in front of an own vehicle.

An imaging device according to a first example is provided with a bracket secured to a windshield glass, a first housing supported by the bracket, a camera unit supported by the first housing, and a hood mounted on the first housing. The hood has a substantially triangular shape that widens in a direction away from the camera unit in front of a lens provided on the camera unit (for example, see Patent Document 1).

An imaging device according to a second example is provided with a securing bracket secured to a windshield glass, a camera unit, and a camera bracket that secures the camera unit to the securing bracket. In a case where the camera unit is secured to the securing bracket, a hood part having a substantially triangular shape that widens in a direction away from the camera unit in front of a lens provided on the camera unit is integrally molded to the securing bracket. That is, with the imaging device according to the second example, the hood part, which corresponds to the hood provided on the imaging device according to the first example, is integrated with the securing bracket (for example, see Patent Document 2).

DOCUMENTS OF THE PRIOR ART

Patent Documents

Patent Document 1: Japanese Patent Publication No. 2019-64425.
Patent Document 2: Japanese Patent Publication No. 2018-12406.

SUMMARY OF THE INVENTION

Problem to be Solved by the Invention

With the imaging device according to the first example, because a lens is assembled to an end of a hood mounted on a first housing, a camera unit must be removed from the first housing before the hood when removing the hood from the imaging device. Furthermore, with the imaging device according to the second example, because a hood is integrated with a securing bracket, the hood cannot be removed from the imaging device while the imaging device is mounted on a windshield.

An object of the present disclosure is to provide an imaging device for a mounting device that makes it easy to remove a hood.

Means for Solving the Problem

According to one aspect of the present disclosure, an imaging device for a mounting device, comprises a bracket supporting a camera unit having a light receiving unit, and configured to be mounted on an attachment subject, and a hood having a surface expanding in a direction away from the light receiving unit in front of the light receiving unit, and mounted on the bracket so that the surface faces the attachment subject, wherein the hood can be removed from the bracket along the attachment subject while the camera unit is being supported by the bracket.

PREFERRED EMBODIMENTS OF THE INVENTION

First Embodiment

A first embodiment of an imaging device for a mounting device will be described with reference to FIG. 1 through FIG. 6.

Figure 1:
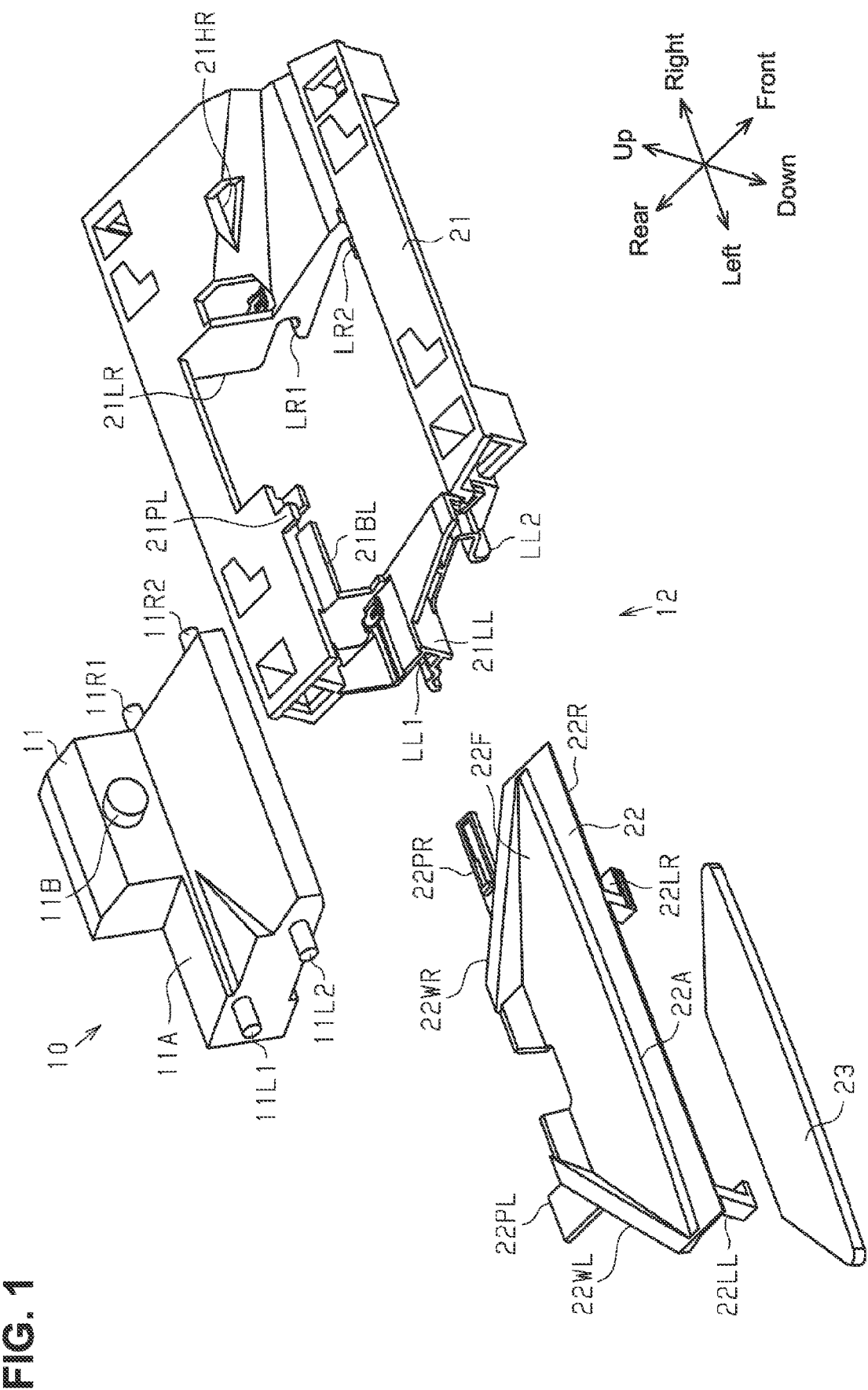
FIG. 1 is an exploded perspective view illustrating a structure of an imaging device for a vehicle according to a first embodiment.

An imaging device for a vehicle 10 illustrated in FIG. 1 is mounted on an attachment subject and receives light incident through the attachment subject. The attachment subject is a surface of a transparent member that is optically transparent and transmits visible light, and is, for example, a surface inside a vehicle cabin on a window glass for a vehicle. The imaging device for a vehicle 10 is mounted on a surface of a pair of surfaces of the window glass included inside a vehicle cabin. The window glass is, for example, a windshield glass, but may also be a sunroof glass, a rear glass, or the like. The imaging device for a vehicle 10 includes a camera unit 11 and a mounting device 12.

The camera unit 11 includes a camera body 11A, and a lens 11B, which is one example of a light receiving unit. The camera body 11A includes, for example, an imaging element, a recording element, and a housing, and the like, in which these elements are housed. The lens 11B is exposed outside the camera body 11A and receives light incident through the attachment subject.

The mounting device 12 is a device for mounting the camera unit 11 to the attachment subject. The mounting device 12 includes a bracket 21 and a lens hood 22. The bracket 21 supports the camera unit 11 that includes the lens 11B. The bracket 21 is mounted on the attachment subject while supporting the camera unit 11. The lens hood 22 includes a surface 22F that expands in a direction away from the lens 11B in front of the lens 11B. The lens hood 22 is mounted on the bracket 21 so that the surface 22F faces the attachment subject. The lens hood 22 can be removed from the bracket 21 along the attachment subject while the camera unit 11 is being supported by the bracket 21.

Because the lens hood 22 can be removed along the attachment subject from the bracket 21 supporting the camera unit 11, the lens hood 22 can be removed without removing the camera unit 11 or the entire mounting device 12. Therefore, the lens hood 22 can be removed easily.

Furthermore, the lens hood 22 can, while the camera unit 11 is mounted on the bracket 21, be mounted on the bracket 21 along a direction opposite a direction in which the lens hood 22 is removed. Therefore, because the lens hood 22 can be mounted along the attachment subject to the bracket 21 supporting the camera unit 11, mounting the lens hood 22 does not require removal of the camera unit 11 or the entire mounting device 12. Therefore, the lens hood 22 can be mounted easily.

Each member included in the imaging device for a vehicle 10 is described in detail below with reference to FIG. 1.

The camera body 11A included in the camera unit 11 has an outer shape in which a substantially L-shaped cross-sectional shape is continuous along a left-right direction of the imaging device for a vehicle 10. The camera unit 11 includes a first right engaging part 11R1, a second right engaging part 11R2, a first left engaging part 11L1, and a second left engaging part 11L2. A pair of the right engaging parts 11R1 and 11R2 has a columnar shape protruding in the left-right direction from a right side surface of the camera body 11A. A pair of the left engaging parts 11L1 and 11L2 has a columnar shape protruding in the left-right direction from a left side surface of the camera body 11A. A pair of the first engaging parts 11R1 and 11L1 extends along the same central axis. A pair of the second engaging parts 11R2 and 11L2 extends along the same central axis in a different position than the pair of first engaging parts 11R1 and 11L1. The pair of second engaging parts 11R2 and 11L2 is positioned in front of the pair of first engaging parts 11R1 and 11L1.

The bracket 21 is mounted on the attachment subject by a mounting member such as an adhesive member, a fastening member, or the like. The bracket 21 is a resin molded product formed using synthetic resin. The bracket 21 includes a right engaging leg 21LR and a left engaging leg 21LL. A pair of the engaging legs 21LR and 21LL is aligned in the left-right direction in the bracket 21 with a gap therebetween. Each of the engaging legs 21LR and 21LL is shaped extending along a front-rear direction.

The right engaging leg 21LR includes a first right engaging groove LR1 and a second right engaging groove LR2. The left engaging leg 21LL includes a first left engaging groove LL1 and a second left engaging groove LL2. A pair of the first engaging grooves LR1 and LL1 is positioned on the same axis extending in the left-right direction. A pair of the second engaging grooves LR2 and LL2 is positioned on the same axis extending in the left-right direction. The pair of second engaging grooves LR2 and LL2 is positioned in front the pair of first engaging grooves LR1 and LL1.

When the imaging device for a vehicle 10 is assembled, the first right engaging part 11R1 is fitted into the first right engaging groove LR1, and the first left engaging part 11L1 is fitted into the first left engaging groove LL1. Furthermore, the second right engaging part 11R2 is fitted into the second right engaging groove LR2, and the second left engaging part 11L2 is fitted into the second left engaging groove LL2. This results in the bracket 21 supporting the camera unit 11.

The bracket 21 includes a right engaging hole 21HR that passes through the right engaging leg 21LR. The right engaging hole 21HR is positioned midway along the front-rear direction in the right engaging leg 21LR. The right engaging hole 21HR is positioned above the first right engaging groove LR1 and the second right engaging groove LR2, which are on the right engaging leg 21LR.

The bracket 21 also includes a left engaging piece 21PL and a left guiding strip 21BL. The left engaging piece 21PL is positioned on, of a pair of sides extending in the left-right direction on the bracket 21, the rearward of these sides. The left engaging piece 21PL and the left guiding strip 21BL are positioned above the first left engaging groove LL1 and the second engaging groove LL2, which are on the left engaging leg 21LL. The left guiding strip 21BL is positioned below the left engaging piece 21PL. The left engaging piece 21PL is rectangular extending along the front-rear direction and projects into an opening defined by the bracket 21. In the same way as the left engaging piece 21PL, the left guiding strip 21BL is positioned on, in a pair of sides extending in the left-right direction on the bracket 21, the rearward of these sides. The left guiding strip 21BL extends along the left-right direction from a left end on said side.

Figure 4:
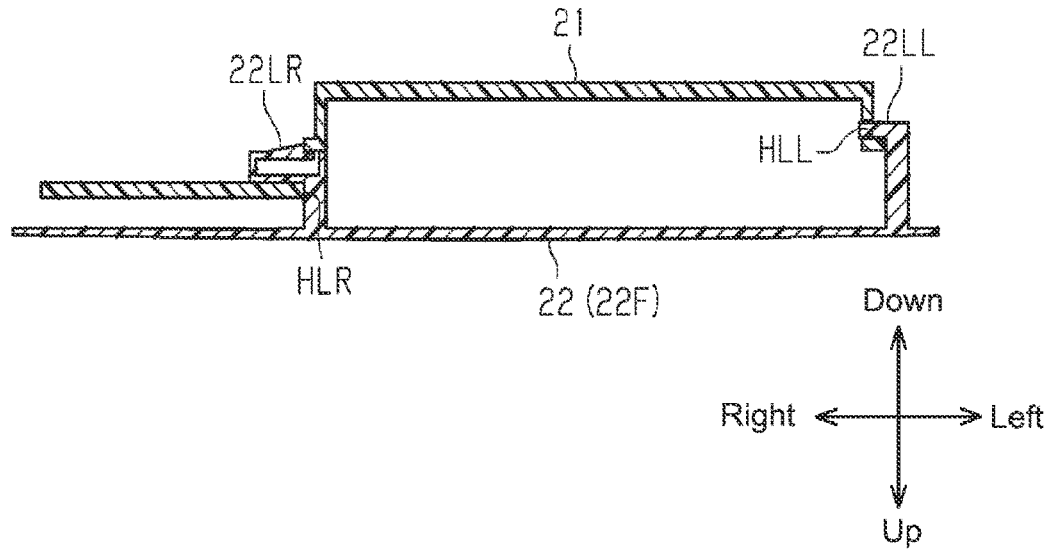
FIG. 4 is an end surface view along line IV-IV of FIG. 3.

Note that the bracket 21 includes a right leg engaging hole and a left leg engaging hole that are not illustrated in the drawings (see FIG. 4).

In the same way as the bracket 21 described above, the lens hood 22 is a resin molded product formed using synthetic resin. The lens hood 22 includes a hood body 22A. The hood body 22A is substantially trapezoidal and includes a surface 22F. The surface 22F is a surface of the lens hood 22 that faces the attachment subject when the imaging device for a vehicle 10 is mounted on the attachment subject. A rear surface 22R is a surface on the hood body 22A on a side opposite the surface 22F.

The lens hood 22 includes a right wall part 22WR and a left wall part 22WL. The right wall part 22WR is substantially L-shaped along a right diagonal side of and part of an upper base on the hood body 22A. The left wall part 22WL is substantially L-shaped along a left diagonal side of and part of an upper base on the hood body 22A. The lens 11B of the camera unit 11 is positioned between the pair of wall parts 22WR and 22WL when the lens hood 22 is supported by the bracket 21. Therefore, the hood body 22A is shaped expanding in front of the lens 11B in a direction away from the lens 11B.

The lens hood 22 includes a right engaging protrusion 22PR, a left engaging protrusion 22PL, a right engaging leg 22LR, and a left engaging leg 22LL.

The right engaging protrusion 22PR protrudes from the hood body 22A and is thus shaped so as to extend along the direction in which the lens hood 22 is removed. By engaging with the bracket 21, the right engaging protrusion 22PR engages the hood body 22A to the bracket 21. The right engaging protrusion 22PR is one example of a first engaging part.

The right engaging protrusion 22PR is connected to a rear right end of the hood body 22A. The right engaging protrusion 22PR is rectangular extending along the left-right direction. When the lens hood 22 mounted on the bracket 21 is removed from the bracket 21, the lens hood 22 is pulled out along the attachment subject and the left-right direction from the bracket 21. Because, at this time, the right engaging protrusion 22PR extends along the direction in which the lens hood 22 is removed, the lens hood 22 can be removed from the bracket 21 by sliding the lens hood 22 along the attachment subject.

The left engaging protrusion 22PL is one example of a second engaging part. The left engaging protrusion 22PL is connected to a rear left end of the hood body 22A. The left engaging protrusion 22PL is rectangular extending along the front-rear direction and protrudes from the hood body 22A in the front-rear direction. By engaging with the bracket 21, the left engaging protrusion 22PL engages the hood body 22A to the bracket 21.

The left engaging protrusion 22PL extends along a direction that intersects a direction in which the right engaging protrusion 22PR extends. When the lens hood 22 is mounted on the bracket 21, the lens hood 22 is inserted into the bracket 21 along, in the same way as when removed, the attachment subject and the left-right direction. However, a direction in which the lens hood 22 slides when mounted, and a direction in which the lens hood 22 slides when removed, are oriented opposite one another. That is, the direction in which the lens hood 22 slides when mounted is a direction on the bracket 21 from the left engaging leg 21LL to the right engaging leg 21LR. Conversely, the direction in which the lens hood 22 slides when removed is a direction on the bracket 21 from the right engaging leg 21LR to the left engaging leg 21LL.

Because the lens hood 22 slides in the direction from the right engaging leg 21LR to the left engaging leg 21LL when the lens hood 22 is mounted on the bracket 21, the left engaging protrusion 22PL is positioned behind the right engaging protrusion 22PR in a direction in which the lens hood 22 is mounted. The lens hood 22 can be mounted on the bracket 21 by both the right engaging protrusion 22PR and the left engaging protrusion 22PL by mounting the lens hood 22 along the attachment subject. Thus, the lens hood 22 can be mounted on the bracket 21 more securely than in a case where the lens hood 22 is mounted on the bracket 21 by one engaging part.

The right engaging leg 22LR is connected to the rear surface 22R of the hood body 22A. The right engaging leg 22LR protrudes along an up-down direction from a front side on the hood body 22A. The right engaging leg 22LR is substantially L-shaped in a cross section along a surface prescribed by the left-right direction and the up-down direction, and the L-shaped cross section has a shape that continues along the front-rear direction.

The left engaging leg 22LL is connected to the rear surface 22R of the hood body 22A. The left engaging leg 22LL protrudes along the up-down direction from a front left end on the hood body 22A. The left engaging leg 22LL is substantially L-shaped in a cross section along a surface prescribed by the left-right direction and the up-down direction, and the L-shaped cross section has a shape that continues along the front-rear direction.

When the imaging device for a vehicle 10 is assembled, the right engaging leg 22LR is fitted into the right leg engaging hole (see FIG. 4) described above, and the left engaging leg 22LL is fitted into the left leg engaging hole described above. This results in the lens hood 22 being supported by the bracket 21.

The mounting device 12 includes a heating unit 23. The heating unit 23 is substantially trapezoidal. A width of the heating unit 23 in the left-right direction is about the same as a width of the hood body 22A. A width of the heating unit 23 in the front-rear direction is about the same as a width of the hood body 22A. An area to be heated by the heating unit 23 is about the same shape and size as an external form of the heating unit 23.

The heating unit 23 may be, for example, a planar heating element. The heating unit 23 includes, for example, a planar good conductor, a current-carrying unit, and a pair of insulating films. The current-carrying unit is formed of a single heating wire and is connected to a supplying unit not illustrated in the drawings. The current-carrying unit is sandwiched between the pair of insulating films. The planar good conductor is affixed on one of the insulating films. The supplying unit is electrically connected to the heating unit 23 and supplies electric current to the heating unit 23. The heating unit 23 is affixed to the rear surface 22R of the hood body 22A by an adhesive, a glue, and the like.

Figure 2:
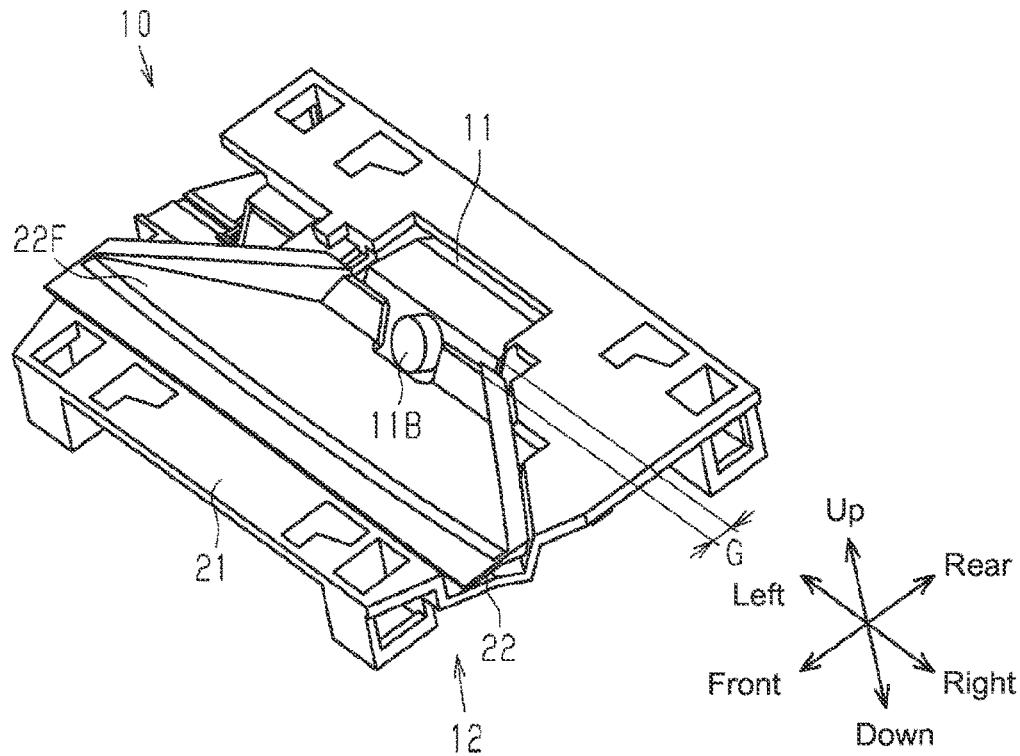
FIG. 2 is a perspective view of the imaging device for a vehicle illustrated in FIG. 1 in an assembled state.

FIG. 2 illustrates the imaging device for a vehicle 10 in an assembled state.

When the imaging device for a vehicle 10 illustrated in FIG. 2 is assembled, the camera unit 11 is first mounted on the pair of engaging legs 21LR and 21LL included on the bracket 21. Next, sliding the lens hood 22 along the left-right direction slides the left engaging protrusion 22PL along the left guiding strip 21BL of the bracket 21 while inserting the right engaging protrusion 22PR of the lens hood 22 into the right engaging hole 21HR of the bracket 21. At this time, the right engaging leg 22LR of the lens hood 22 is fitted into the right leg engaging hole (see FIG. 4) of the bracket 21, and the left engaging leg 22LL of the lens hood 22 is fitted into the left leg engaging hole (see FIG. 4) of the bracket 21. This makes it possible to mount the lens hood 22 to the bracket 21.

As is illustrated in FIG. 2, with the imaging device for a vehicle 10 according to the present embodiment, a gap G in the front-rear direction between the camera body 11A that supports the lens 11B and the lens hood 22 is larger than an amount by which the lens 11B protrudes from the camera body 11A. Therefore, the camera unit 11 does not interfere with sliding of the lens hood 22 when the camera unit 11 is mounted on the bracket 21. That is, the camera unit 11 does not hinder the sliding of the lens hood 22. Therefore, the lens hood 22 can be mounted on the bracket 21 to which the camera unit 11 has been mounted.

Note that when the lens hood 22 is mounted on the bracket 21 for the first time, the camera unit 11 is mounted on the bracket 21, the bracket 21 supporting the camera unit 11 is mounted on the attachment subject, and then, the lens hood 22 is mounted on the bracket 21. Or, the camera unit 11 and the lens hood 22 may be mounted on the bracket 21 in that order, and then, the bracket 21 may be mounted on the attachment subject. In either case, the lens hood 22 can be mounted on the bracket 21 while the camera unit 11 is mounted on the bracket 21.

Meanwhile, the lens hood 22 can also be removed from the bracket 21 mounted on the attachment subject. Because, as is described above, the camera unit 11 does not hinder the sliding of the lens hood 22, the lens hood 22 can be removed from the bracket 21 while the camera unit 11 is mounted on the bracket 21. Because the surface 22F of the lens hood 22 faces the attachment subject while the imaging device for a vehicle 10 is mounted on the attachment subject, the lens hood 22 can be removed along the attachment subject by sliding the lens hood 22 along the left-right direction. For example, the lens hood 22 removed from the bracket 21 for maintenance, or the like, can be remounted on the bracket 21 mounted on the attachment subject.

As is described above, all of the engaging grooves LR1, LR2, LL1, and LL2 for supporting the camera unit 11 in the bracket 21 are positioned below the right engaging hole 21HR, the left engaging piece 21PL, and the left guiding strip 21BL for supporting the lens hood 22. Therefore, the bracket 21 supports part of the camera unit 11 on a side opposite the attachment subject with respect to the lens hood 22 while the camera unit 11 and the lens hood 22 are mounted on the bracket 21. Because, as is described above, the lens hood 22 can be removed along the attachment subject, the lens hood 22 can be removed from the bracket 21, even if part of the camera unit 11 is positioned on a side opposite the attachment subject with respect to the lens hood 22.

Figure 3:
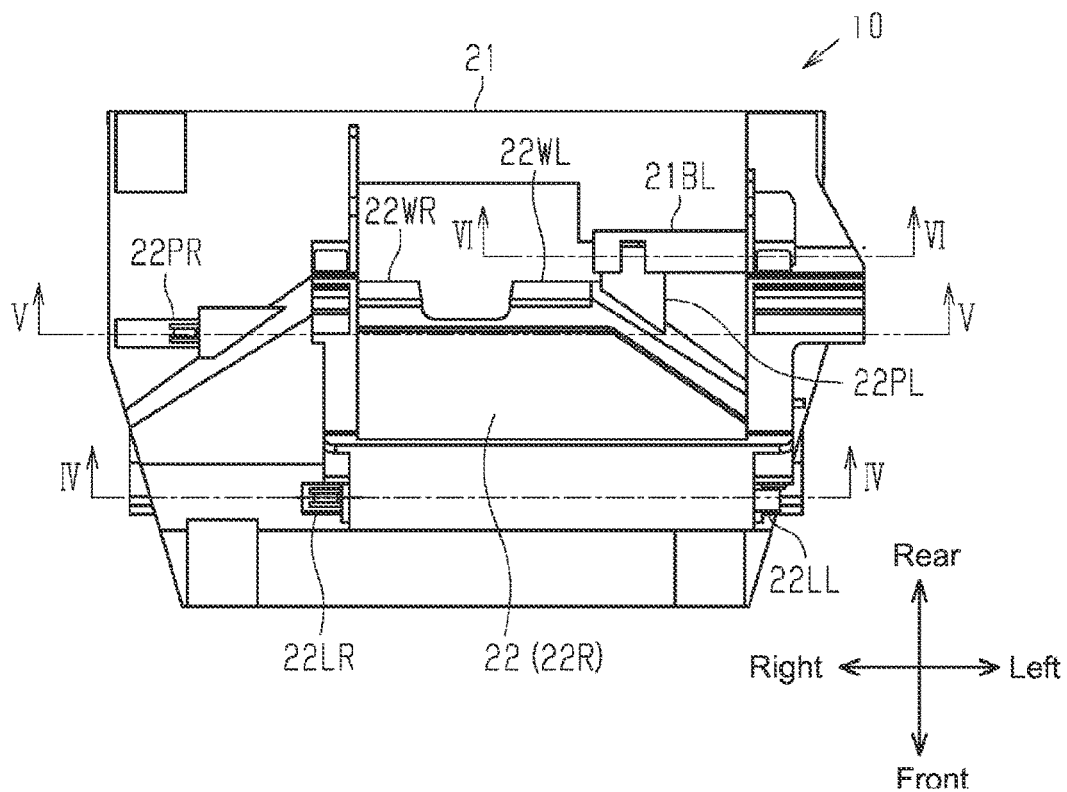
FIG. 3 is a plan view of the imaging device for a vehicle illustrated in FIG. 2 from a perspective facing a rear surface of a bracket body.
Figure 5:
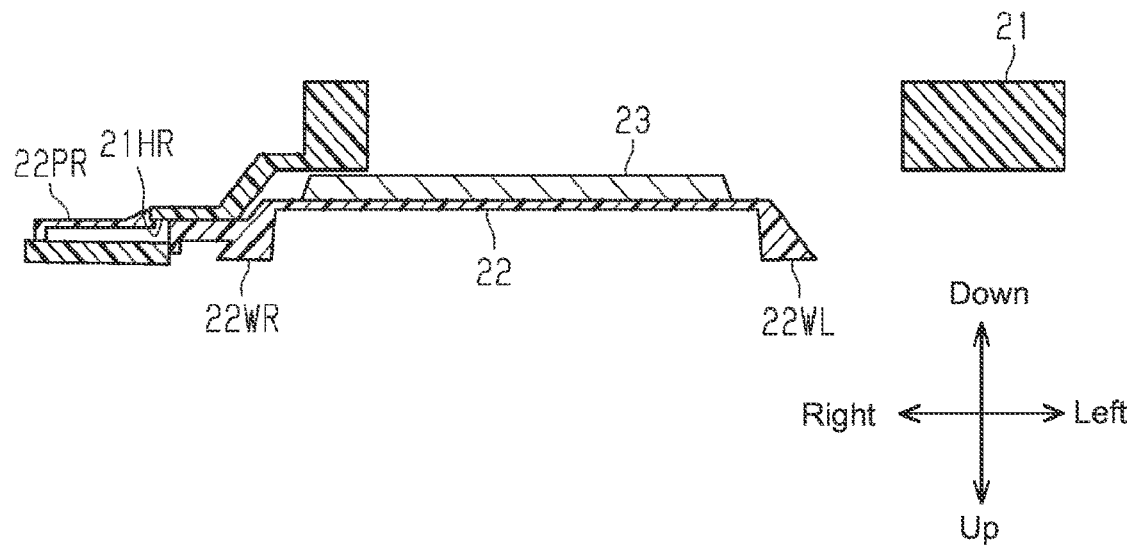
FIG. 5 is an end surface view along line V-V of FIG. 3.
Figure 6:
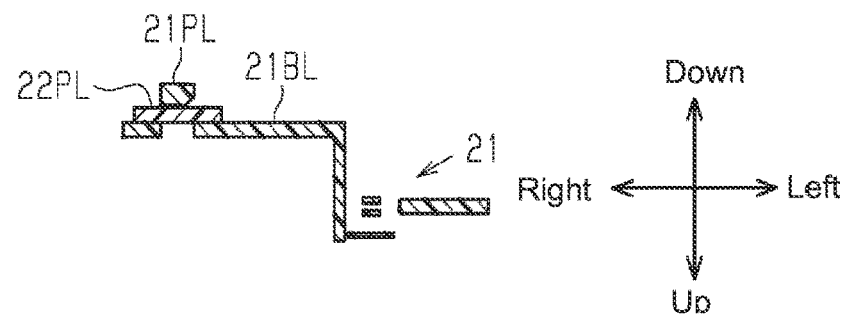
FIG. 6 is an end surface view along line VI-VI of FIG. 3.

FIG. 3 illustrates a planar structure of the imaging device for a vehicle 10 as seen from a viewpoint facing the rear surface 22R of the lens hood 22. Note that in FIG. 3 through FIG. 6, which will be referenced below, the left-right direction is reversed from that in FIG. 1 and FIG. 2 for the convenience of illustration. Also, illustration of the camera unit 11 is omitted in FIG. 3 through FIG. 6 for the convenience of illustration. FIG. 4 illustrates an end surface structure along line IV-IV illustrated in FIG. 3. FIG. 5 illustrates an end surface structure along line V-V illustrated in FIG. 3. FIG. 6 illustrates an end surface structure along line VI-VI illustrated in FIG. 3.

As is illustrated in FIG. 3, with the imaging device for a vehicle 10, the right engaging protrusion 22PR, the left engaging protrusion 22PL, the right engaging leg 22LR, and the left engaging leg 22LL included on the lens hood 22 are all supported by the bracket 21. This results in the lens hood 22 being supported by the bracket 21. The structure where the right engaging protrusion 22PR, the left engaging protrusion 22PL, the right engaging leg 22LR, and the left engaging leg 22LL are all supported by the bracket 21 is described in greater detail below with reference to FIG. 4 to FIG. 6.

FIG. 4 illustrates a structure where the right engaging leg 22LR and the left engaging leg 22LL of the lens hood 22 are supported by the bracket 21.

As is illustrated in FIG. 4, the bracket 21 includes a right leg engaging hole HLR and a left leg engaging hole HLL that pass through the bracket 21 in the left-right direction. When the lens hood 22 is mounted on the bracket 21, the right engaging leg 22LR is fitted into the right leg engaging hole HLR and the left engaging leg 22LL is fitted into the left leg engaging hole HLL.

The left engaging leg 22LL fits into the left leg locking hold HLL so as to be able to slide in the left-right direction with respect to the left leg engaging hole HLL. Therefore, the left engaging leg 22LL can be removed from the left leg engaging hole HLL simply by sliding the lens hood 22 in the left-right direction.

Meanwhile, after the right engaging leg 22LR has been fitted into the right leg engaging hole HLR, the right engaging leg 22LR is restricted from sliding in the left-right direction by the bracket 21. However, the slide restriction by the bracket 21 can be released by pushing up from below on a portion of the right engaging leg 22LR that has passed through the right leg engaging hole HLR. The right engaging leg 22LR can be removed from the right leg engaging hole HLR by pushing up on the portion of the right engaging leg 22LR that has passed through the right leg engaging hole HLR and sliding the lens hood 22 in the left-right direction while maintaining an upward pushing state.

FIG. 5 illustrates a structure where the right engaging protrusion 22PR of the lens hood 22 is supported by the bracket 21.

As is illustrated in FIG. 5, the right engaging protrusion 22PR is fitted into the right engaging hole 21HR while the lens hood 22 is mounted on the bracket 21. The right engaging protrusion 22PR is thus restricted from sliding in the left-right direction by the bracket 21. However, the slide restriction by the bracket 21 can be released by pushing up from below on a portion of the right engaging protrusion 22PR that has passed through the right engaging hole 21HR. The right engaging protrusion 22PR can be removed from the right engaging hole 21HR by sliding the lens hood 22 in the left-right direction while maintaining a state of pushing upward on the portion of the right engaging protrusion 22PR that has passed through the right engaging hole 21HR.

Note that, to remove the lens hood 22 from the bracket 21, the slide restriction on the right engaging leg 22LR and the slide restriction on the right engaging protrusion 22PR must be released simultaneously.

FIG. 6 illustrates a structure where the left engaging protrusion 22PL of the lens hood 22 is supported by the bracket 21.

As is illustrated in FIG. 6, when the lens hood 22 is mounted on the bracket 21, the left engaging protrusion 22PL is sandwiched between the left engaging piece 21PL and the left guiding strip 21BL in the up-down direction. Because the left engaging protrusion 22PL is sandwiched between the left engaging piece 21PL and the left guiding strip 21BL in a state where the left engaging protrusion 22PL can be slid in the left-right direction, the left engaging protrusion 22PL can be moved to the left of the left engaging piece 21PL just by sliding the lens hood 22 in the left-right direction.

The effects disclosed below can be obtained according to the first embodiment of the imaging device mounting device as described above.

(1) Because the lens hood 22 can be removed along the attachment subject from the bracket 21 supporting the camera unit 11, the lens hood 22 can be removed without removing the camera unit 11 or the entire mounting device 12. Therefore, the lens hood 22 can be removed easily.

(2) Because the lens hood 22 can be mounted along the attachment subject to the bracket 21 supporting the camera unit 11, mounting the lens hood 22 does not require removal of the camera unit 11 or the entire mounting device 12. Therefore, the lens hood 22 can be mounted easily.

(3) Because the right engaging protrusion 22PR extends along the direction in which the lens hood 22 is removed, the lens hood 22 can be removed from the bracket 21 by sliding the lens hood 22 along the attachment subject.

(4) The lens hood 22 can be mounted on the bracket 21 by both the right engaging protrusion 22PR and the left engaging protrusion 22PL. Thus, the lens hood 22 can be mounted on the bracket 21 more securely than in a case where the lens hood 22 is mounted on the bracket 21 by one engaging part.

(5) Because the lens hood 22 can be removed along the attachment subject, the lens hood 22 can be removed from the bracket 21, even if part of the camera unit 11 is positioned on a side opposite the attachment subject with respect to the lens hood 22.

Second Embodiment

A second embodiment of the imaging device mounting device will be described with reference to FIG. 7 through FIG. 13. In the second embodiment, a lens hood is slid in a different direction with respect to a bracket than in the first embodiment described above. Therefore, points that differ from the first embodiment will be described in particular detail below.

Figure 7:
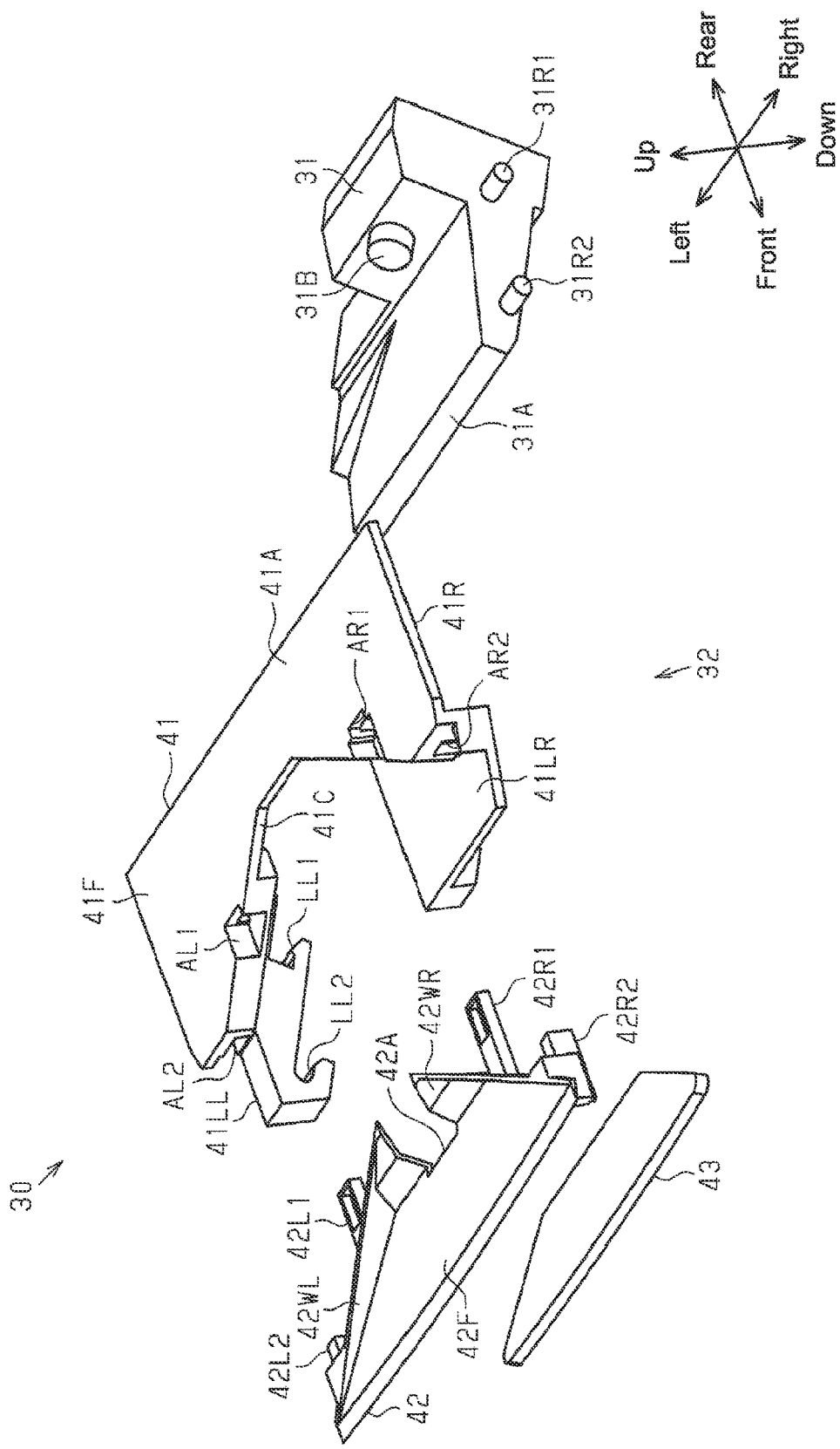
FIG. 7 is an exploded perspective view illustrating a structure of an imaging device for a vehicle according to a second embodiment.

In the same way as the imaging device for a vehicle 10 according to the first embodiment, an imaging device for a vehicle 30 illustrated in FIG. 7 is mounted on an attachment subject and receives light incident through the attachment subject. The attachment subject is a transparent member that is optically transparent and transmits visible light, and is, for example, a window glass for a vehicle. The imaging device for a vehicle 10 is mounted on a surface, in a pair of surfaces the window glass includes, inside a vehicle cabin. The window glass is, for example, a windshield glass, but may also be a sunroof glass, a rear glass, or the like. The imaging device for a vehicle 30 includes a camera unit 31 and a mounting device 32.

The camera unit 31 includes a camera body 31A and a lens 31B, which is one example of a light receiving unit. The camera body 31A includes, for example, an imaging element, a recording element, a housing, and the like, in which these elements are housed. The lens 31B is exposed outside the camera body 31A and receives light incident through the attachment subject.

The mounting device 32 is a device for mounting the camera unit 31 to the attachment subject. The mounting device 32 includes a bracket 41 and a lens hood 42. The bracket 41 supports the camera unit 31 that includes the lens 31B. The bracket 41 is mounted on the attachment subject while supporting the camera unit 31. The lens hood 42 includes a surface 42F that expands in a direction away from the lens 31B in front of the lens 31B. The lens hood 42 is mounted on the bracket 41 so that the surface 42F faces the attachment subject. The lens hood 42 can be removed from the bracket 41 along the attachment subject while the camera unit 31 is being supported by the bracket 41.

Because the lens hood 42 can be removed along the attachment subject from the bracket 41 supporting the camera unit 31, the lens hood 42 can be removed without removing the camera unit 31 or the entire mounting device 32. Therefore, the lens hood 42 can be removed easily.

Furthermore, the lens hood 42 can, while the camera unit 31 is mounted on the bracket 41, be mounted on the bracket 41 along a direction opposite a direction in which the lens hood 42 is removed. Therefore, because the lens hood 42 can be mounted along the attachment subject to the bracket 41 supporting the camera unit 31, mounting the lens hood 42 does not require removal of the camera unit 31 or the entire mounting device 32. Therefore, the lens hood 42 can be mounted easily.

Each member included in the imaging device for a vehicle 30 is described in detail below with reference to FIG. 7.

The camera body 31A included in the camera unit 31 has an outer shape in which a substantially L-shaped cross-sectional shape is continuous along a left-right direction of the imaging device for a vehicle 30. The camera unit 31 includes a first right engaging part 31R1, a second right engaging part 31R2, a first left engaging part not illustrated in the drawings, and a second left engaging part not illustrated in the drawings. A pair of the right engaging parts 31R1 and 31R2 has a columnar shape protruding in the left-right direction from a right side surface of the camera body 31A. A pair of the left engaging parts has a columnar shape protruding in the left-right direction from a left side surface of the camera body 31A. A pair of the first engaging parts extends along the same central axis. A pair of the second engaging parts extends along the same central axis in a different position than the pair of first engaging parts. The pair of second engaging parts is positioned in front of the pair of first engaging parts.

The bracket 41 is mounted on the attachment subject by a mounting member such as an adhesive member, a fastening member, or the like. The bracket 41 is a resin molded product formed using synthetic resin. The bracket 41 includes a substantially rectangular plate-shaped bracket body 41A. The bracket body 41A includes a surface 41F, and a rear surface 41R on a side opposite the surface 41F. When the imaging device for a vehicle 30 is mounted on the attachment subject, the surface 41F of the bracket body 41A is positioned along the attachment subject. The bracket body 41A includes a substantially V-shaped cutout 41C on a front edge extending along the left-right direction.

The bracket 41 includes a right engaging leg 41LR and a left engaging leg 41LL. Each of the engaging legs 41LR and 41LL is connected to the rear surface 41R of the bracket body 41A. Each of the engaging legs 41LR and 41LL is shaped extending along the front-rear direction, and part of each of the engaging legs 41LR and 41LL is exposed in the cutout 41C.

The right engaging leg 41LR includes a first right engaging groove and a second right engaging groove that are not illustrated in the drawings. The left engaging leg 21LL includes a first left engaging groove LL1 and a second left engaging groove LL2. A pair of the first engaging grooves is positioned on the same axis extending in the left-right direction. A pair of the second engaging grooves is positioned on the same axis extending in the left-right direction. The pair of second engaging grooves is positioned in front of the pair of first engaging grooves.

When the imaging device for a vehicle 30 is assembled, the first right engaging part 31R1 is fitted into the first right engaging groove, and the first left engaging part is fitted into the first left engaging groove LL1. Furthermore, the second right engaging part 31R2 is fitted into the second right engaging groove, and the second left engaging part is fitted into the second left engaging groove LL2. This results in the bracket 41 supporting the camera unit 31.

The bracket body 41A includes a first right body groove AR1 and a first left body groove AL1. The first right body groove AR1 is positioned to the right of a center of the cutout 41C. The first right body groove AR1 forms a cavity in the surface 41F and an opening in the cutout 41C. On a side surface defined by the first right body groove AR1, a hole is formed that passes through the bracket 41 along the front-rear direction. The first left body groove AL1 is positioned to the left of the center of the cutout 41C. The first left body groove AL1 forms a cavity in the surface 41F and an opening in the cutout 41C. On a side surface defined by the first left body groove AL1, a hole is formed that passes through the bracket 41 along the front-rear direction.

The bracket body 41A includes a second right body groove AR2 and a second left body groove AL2. The second right body groove AR2 and the second left body groove AL2 are positioned on a side surface of the bracket body 41A. The side surface connects the surface 41F and the rear surface 41R. The second right body groove AR2 is open facing downward on a right end of the cutout 41C. On a side surface defined by the second left body groove AL2, a hole is formed that passes through the bracket 41 along the front-rear direction. The second left body groove AL2 is open facing sideways on a left end of the cutout 41C.

The first right body groove AR1, second right body groove AR2, first left body groove AL1, and second left body groove AL2 are grooves for securing the lens hood 42 to the bracket 41. The first right body groove AR1, second right body groove AR2, first left body groove AL1, and second left body groove AL2 are positioned above the right engaging leg 41LR and the left engaging leg 41LL.

In the same way as the bracket 41 described above, the lens hood 42 is a resin molded product formed using synthetic resin. The lens hood 42 includes a hood body 42A. The hood body 42A is substantially trapezoidal and includes a surface 42F. The surface 42F is a surface of the lens hood 42 that faces the attachment subject when the imaging device for a vehicle 30 is mounted on the attachment subject.

The lens hood 42 includes a right wall part 42WR and a left wall part 42WL. The right wall part 42WR is substantially L-shaped along a right diagonal side of and part of an upper base on the hood body 42A. The left wall part 42WL is substantially L-shaped along a left diagonal side of and part of an upper base on the hood body 42A. The lens 31B of the camera unit 31 is positioned between the pair of wall parts 42WR and 42WL when the lens hood 42 is supported by the bracket 41. Therefore, the hood body 42A is shaped expanding in front of the lens 31B in a direction away from the lens 31B.

The lens hood 42 includes a first right engaging protrusion 42R1, a second right engaging protrusion 42R2, a first left engaging protrusion 42L1, and a second left engaging protrusion 42L2. Each of the engaging protrusions 42R1, 42R2, 42L1, and 42L2 is an example of an engaging part. That is, by engaging with the bracket 41, each of the engaging protrusions 42R1, 42R2, 42L1, and 42L2 locks the hood body 42A to the bracket 41. The first right engaging protrusion 42R1 is connected to a middle of a right diagonal side of the hood body 42A. The first right engaging protrusion 42R1 is rectangular extending along the front-rear direction. The first left engaging protrusion 42L1 is connected to a middle of a left diagonal side of the hood body 42A. The first left engaging protrusion 42L1 is rectangular extending along the front-rear direction. The second right engaging protrusion 42R2 is connected to a right end of the hood body 42A. The second right engaging protrusion 42R2 is substantially rectangular extending along the front-rear direction. The second left engaging protrusion 42L2 is connected to a left end of the hood body 42A. The second left engaging protrusion 42L2 is substantially rectangular extending along the front-rear direction.

When the lens hood 42 mounted on the bracket 41 is removed from the bracket 21, the lens hood 42 is pulled out along the attachment subject and the front-rear direction. Thus, because each of the engaging protrusions 42R1, 42R2, 42L1, and 42L2 extends along the direction in which the lens hood 42 is removed, the lens hood 42 can be removed from the bracket 41 by sliding the lens hood 42 along the attachment subject.

A mounting device 42 includes a heating unit 43. The heating unit 43 is substantially trapezoidal. A width of the heating unit 43 in the left-right direction is about the same as a width of the hood body 42A. A width of the heating unit 43 in the front-rear direction is about the same as a width of the hood body 42A. An area to be heated by the heating unit 43 is about the same shape and size as an external form of the heating unit 43.

The heating unit 43 may be, for example, a planar heating element. The heating unit 43 includes, for example, a planar good conductor, a current-carrying unit, and a pair of insulating films. The current-carrying unit is formed of a single heating wire and is connected to a supplying unit not illustrated in the drawings. The current-carrying unit is sandwiched between the pair of insulating films. The planar good conductor is affixed on one of the insulating films. The supplying unit is electrically connected to the heating unit 43 and supplies electric current to the heating unit 43. The heating unit 43 is affixed to a rear surface on a side opposite the surface 42F of the hood body 42A by an adhesive, a glue, and the like.

Figure 8:
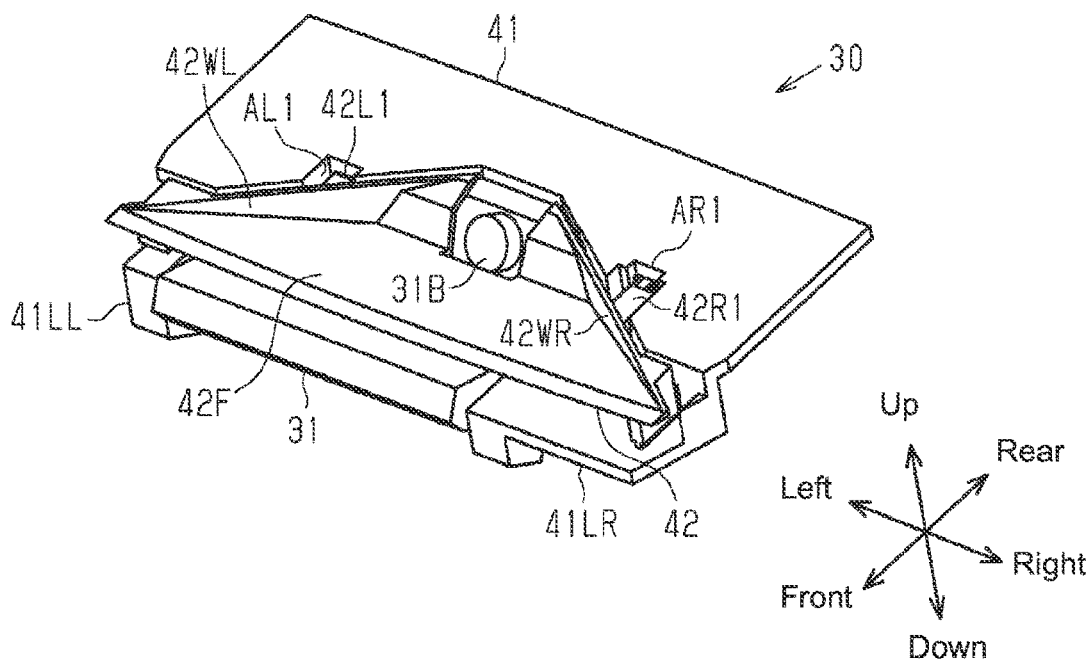
FIG. 8 is a perspective view of the imaging device for a vehicle illustrated in FIG. 7 in an assembled state.

FIG. 8 illustrates the imaging device for a vehicle 30 in an assembled state.

When the imaging device for a vehicle 30 illustrated in FIG. 8 is assembled, the camera unit 31 is first mounted on the pair of engaging legs 41LR and 41LL included on the bracket 41. Next, a pair of the first engaging protrusions 42R1 and 42L1 are inserted into the first body grooves AR1 and AL1 corresponding to each of the first engaging protrusions 42R1 and 42L1 by sliding the lens hood 42 along the front-rear direction. At the same time, a pair of the second engaging protrusions 42R2 and 42L2 is inserted into the second body grooves AR2 and AL2 corresponding to each of the engaging protrusions 42R2 and 42L2. This makes it possible to mount the lens hood 42 to the bracket 41.

With the imaging device for a vehicle 30 according to the present embodiment, the lens hood 42 is removed from the bracket 41 along the front-rear direction. That is, the lens hood 42 is removed from the bracket 41 by sliding the lens hood 42 further forward than the lens 31B along the front-rear direction. Therefore, the camera unit 31 does not interfere with sliding of the lens hood 42 when the camera unit 31 is mounted on the bracket 41. That is, the camera unit 31 does not hinder the sliding of the lens hood 42. Therefore, the lens hood 42 can be mounted on the bracket 41 to which the camera unit 31 has been mounted.

Note that, in the same way as the imaging device for a vehicle 10 according to the first embodiment, when the lens hood 42 is mounted on the bracket 41 for the first time, the camera unit 31 is mounted on the bracket 41, the bracket 41 supporting the camera unit 31 is mounted on the attachment subject, and then, the lens hood 42 is mounted on the bracket 41. Or, the camera unit 31 and the lens hood 42 may be mounted on the bracket 41 in that order, and then, the bracket 41 may be mounted on the attachment subject. In either case, the lens hood 42 can be mounted on the bracket 41 while the camera unit 31 is mounted on the bracket 41.

Meanwhile, the lens hood 42 can also be removed from the bracket 41 mounted on the attachment subject. Because, as is described above, the camera unit 31 does not hinder the sliding of the lens hood 42, the lens hood 42 can be removed from the bracket 41 while the camera unit 31 is mounted on the bracket 41. Because the surface 42F of the lens hood 42 faces the attachment subject while the imaging device for a vehicle 30 is mounted on the attachment subject, the lens hood 42 can be removed along the attachment subject by sliding the lens hood 42 along the front-rear direction. For example, the lens hood 42 removed from the bracket 41 for maintenance, or the like, can be remounted on the bracket 41 mounted on the attachment subject.

As is described above, each of the pair of engaging legs 41LR and 41LL that includes engaging grooves for supporting the camera unit 31 in the bracket 41 is positioned below each of the body grooves AR1, AR2, AL1, and AL2 for supporting the lens hood 42. Therefore, the bracket 41 supports part of the camera unit 31 on a side opposite the attachment subject with respect to the lens hood 42 while the camera unit 31 and the lens hood 42 are mounted on the bracket 41. Because, as is described above, the lens hood 42 can be removed along the attachment subject, the lens hood 42 can be removed from the bracket 41, even if part of the camera unit 31 is positioned on a side opposite the attachment subject with respect to the lens hood 42.

Figure 9:
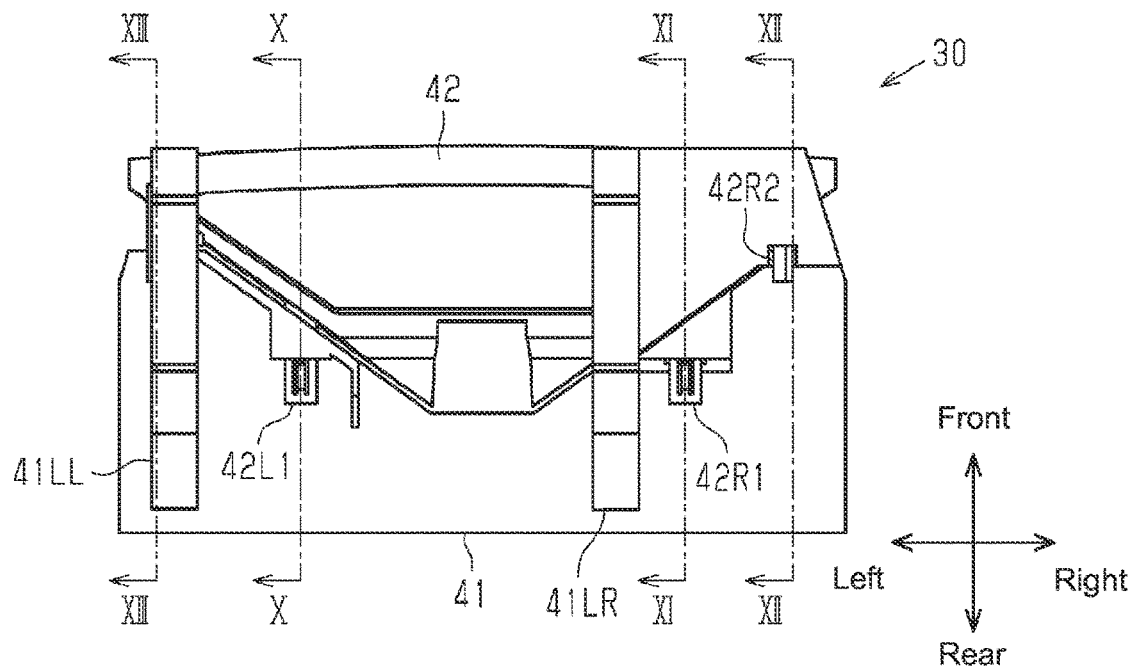
FIG. 9 is a plan view of the imaging device for a vehicle illustrated in FIG. 8 from a perspective facing a rear surface of a bracket body.
Figure 10:
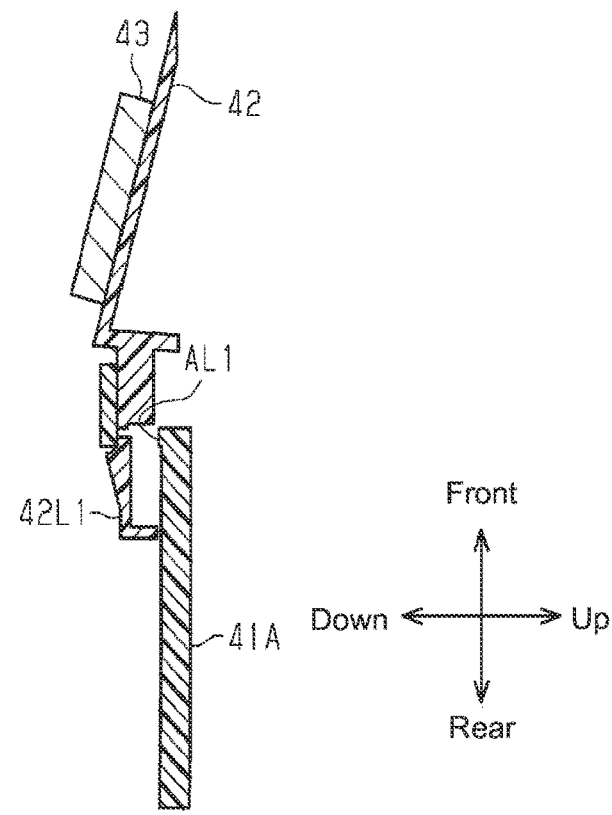
FIG. 10 is an end surface view along line X-X of FIG. 9.
Figure 11:
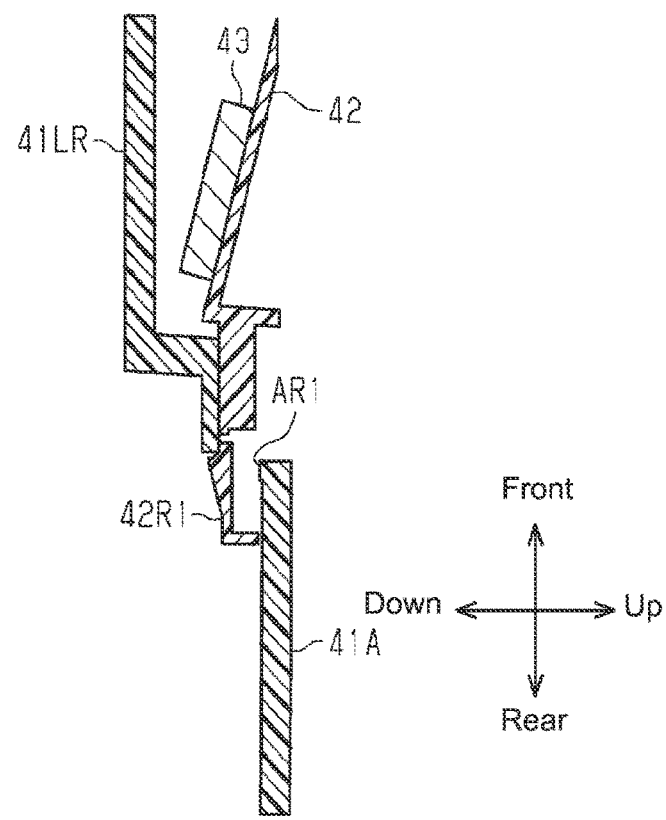
FIG. 11 is an end surface view along line XI-XI of FIG. 9.
Figure 12:
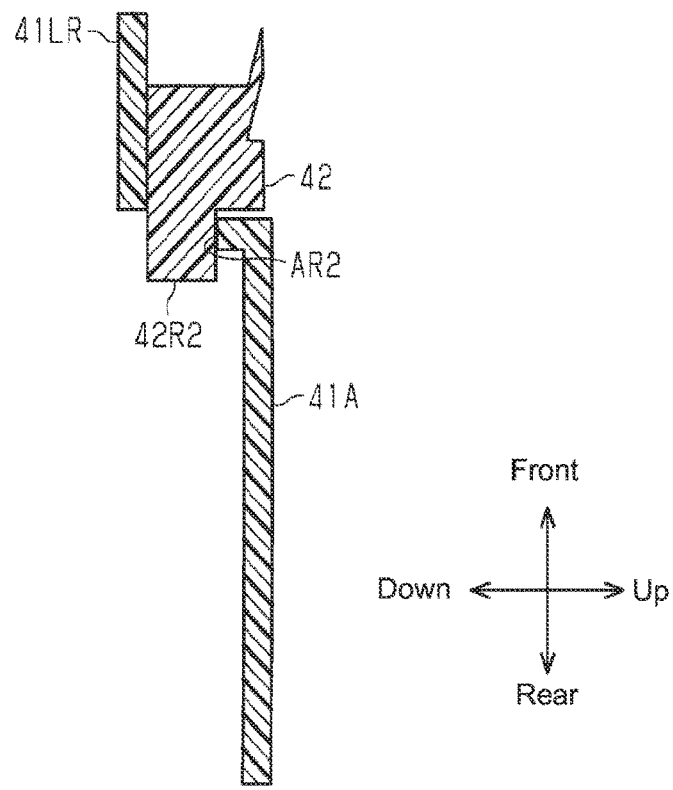
FIG. 12 is an end surface view along line XII-XII of FIG. 9.
Figure 13:
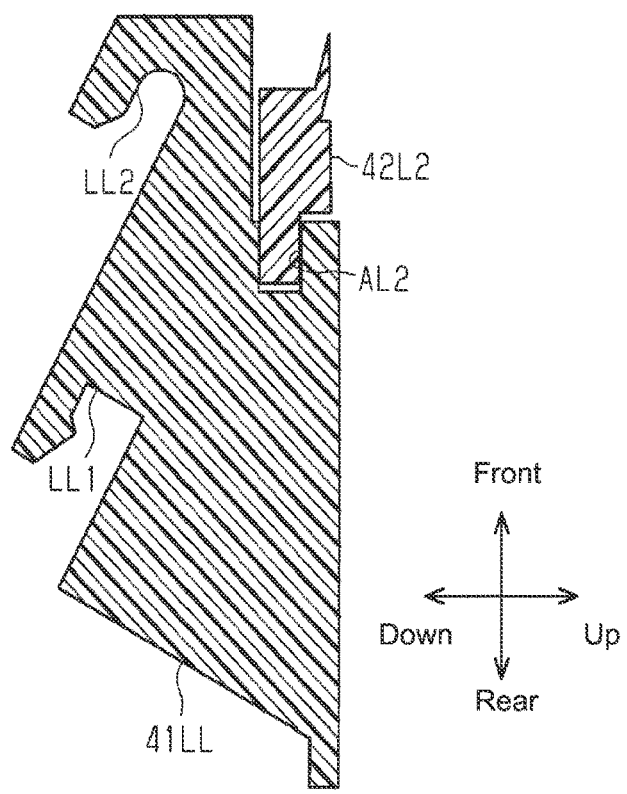
FIG. 13 is an end surface view along line XIII-XIII of FIG. 9.

FIG. 9 illustrates a planar structure of the imaging device for a vehicle 30 as seen from a viewpoint facing the rear surface 41R of the bracket 41. Note that in FIG. 9 through FIG. 13, which will be referenced below, the front-rear direction is reversed from that in FIG. 7 and FIG. 8 for the convenience of illustration. Also, illustration of the camera unit 31 is omitted in FIG. 9 through FIG. 13 for the convenience of illustration. FIG. 10 illustrates an end surface structure along line X-X illustrated in FIG. 9. FIG. 11 illustrates an end surface structure along line XI-XI illustrated in FIG. 9. FIG. 12 illustrates an end surface structure along line XII-XII illustrated in FIG. 9. FIG. 13 illustrates an end surface structure along line XIII-XIII illustrated in FIG. 9.

As is illustrated in FIG. 9, with the imaging device for a vehicle 30, the engaging protrusions 42R1, 42R2, 42L1, and 42L2 included on the lens hood 42 are supported by the bracket 41. This results in the lens hood 42 being supported by the bracket 41. A structure whereby the each of the engaging protrusions 42R1, 42R2, 42L1, and 42L2 is supported by the bracket 41 is described in detail below with reference to FIG. 10 through FIG. 13.

FIG. 10 illustrates a structure where the first left engaging protrusion 42L1 of the lens hood 42 is supported by the bracket 41.

As is illustrated in FIG. 10, the first left engaging protrusion 42L1 is fitted into the hole included in the first left body groove AL1 while the lens hood 42 is mounted on the bracket 41. After the first left engaging protrusion 42L1 is fitted into the hole in the first left body groove AL1, sliding of the first left engaging protrusion 42L1 in the front-rear direction is restricted by the bracket 41. However, the slide restriction by the bracket 41 can be released by pushing up from below on a portion of the first left engaging protrusion 42L1 that has passed through the first left body groove AL1. The first left engaging protrusion 42L1 can be removed from the first left body groove AL1 by pushing up on the portion of the first left engaging protrusion 42L1 that has passed through the first left body groove AL1 and sliding the lens hood 42 in the front-rear direction while maintaining an upward pushing state.

FIG. 11 illustrates a structure where the first right engaging protrusion 42R1 of the lens hood 42 is supported by the bracket 41.

As is illustrated in FIG. 11, the first right engaging protrusion 42R1 is fitted into the hole included in the first right body groove AR1 while the lens hood 42 is mounted on the bracket 41. After the first right engaging protrusion 42R1 is fitted into the hole in the first right body groove AR1, sliding of the first right engaging protrusion 42R1 in the front-rear direction is restricted by the bracket 41. However, the slide restriction by the bracket 41 can be released by pushing up from below on a portion of the first right engaging protrusion 42R1 that has passed through the first right body groove AR1. The first right engaging protrusion 42R1 can be removed from the first right body groove AR1 by pushing up on the portion of the first right engaging protrusion 42R1 that has passed through the first right body groove AR1 and sliding the lens hood 42 in the front-rear direction while maintaining an upward pushing state.

Note that, to remove the lens hood 42 from the bracket 41, the slide restriction on the first right engaging protrusion 42R1 and the slide restriction on the first left engaging protrusion 42L1 must be released simultaneously.

FIG. 12 illustrates a structure where the second right engaging protrusion 42R2 of the lens hood 42 is supported by the bracket 41.

As is illustrated in FIG. 12, the second right engaging protrusion 42R2 is fitted into the bracket body 41A in a state where sliding in the front-rear direction with respect to the hole in the second right body groove AR2 is possible. Therefore, the second right engaging protrusion 42R2 can be removed from the second right body groove AR2 simply by sliding the lens hood 42 in the front-rear direction.

FIG. 13 illustrates a structure where the second left engaging protrusion 42L2 of the lens hood 42 is supported by the bracket 41.

As is illustrated in FIG. 13, while the lens hood 42 is mounted in the bracket 41, the second left engaging protrusion 42L2 is fitted into the second left body groove AL2 in a state slidable in the front-rear direction with respect to the second left body groove AL2. Therefore, the second left engaging protrusion 42L2 can be removed from the second left body groove AL2 simply by sliding the lens hood 42 in the front-rear direction.

The effects like those in (1) through (3) and (5) described above can be obtained according to the second embodiment of the imaging device mounting device as described above.

Modification Examples

Note that each of the embodiments described above may be modified as described below.

[Heating Unit]

The heating units 23 and 43 may be positioned on the surfaces 22F and 42F of the lens hoods 22 and 42. In such cases, it is preferable that the mounting devices 12 and 32 cover the surfaces of the heating units 23 and 43, and include anti-reflection sheets with lower visible light reflectance than the heating units 23 and 43. This makes it easy to heat just the portion of the attachment subject where the lens hoods 22 and 42 are not positioned between the heating units 23 and 43 and the attachment subject.

[Bracket]

The brackets 21 and 41 may not support parts of the camera units 11 and 31 on sides opposite the attachment subject with respect to the lens hoods 22 and 42. That is, the brackets 21 and 41 may support the camera units 11 and 31 only behind the lens hoods 22 and 42. Even in such cases, effects like those in (1) through (4) described above can be obtained in the case of the imaging device for a vehicle 10 according to the first embodiment, and effects like those in (1) through (3) described above can be obtained in the case of the imaging device for a vehicle 30 according to the second embodiment.

[Lens Hood]

The lens hood 22 included on the imaging device for a vehicle 10 according to the first embodiment may include an engaging part that extends along the left-right direction, and, conversely, not include an engaging part that extends in a direction that intersects the left-right direction. Effects like those in (1) through (3) and (5) described above can be obtained even in such cases.

The lens hoods 22 and 42 may be configured to be mountable in a direction that intersects the direction in which the hood lens 22 and 42 are removed from the brackets 21 and 41. Effects like those in (1) described above can be obtained even in such cases as long as the lens hoods 22 and 42 can be removed along the direction in which the hoods are removed from the brackets 21 and 41.

The lens hoods 22 and 42 may be configured to be removable from the brackets 21 and 41 by being rotated around rotation axes positioned within the lens hoods 22 and 42. In such cases, at least the lens hoods 22 and 42 may be configured to be moveable along the attachment subject immediately after the lens hoods 22 and 42 are removed from the brackets 21 and 41. Or, the lens hoods 22 and 42 may be configured to be removable from the brackets 21 and 41 by being rotated around rotation axes positioned outside the lens hoods 22 and 42. In such cases, at least the lens hoods 22 and 42 may be configured to be moveable along the attachment subject immediately after the lens hoods 22 and 42 are removed from the brackets 21 and 41.

Note that when the lens hoods 22 and 42 are configured to be removable from the brackets 21 and 41 by rotation around rotation axes positioned within the lens hoods 22 and 42, the lens hoods 22 and 42 may be configured to be mountable with respect to the brackets 21 and 41 by rotation around the same axes as the axes used during removal. Also note that when the lens hoods 22 and 42 are configured to be removable from the brackets 21 and 41 by rotation around rotation axes positioned outside the lens hoods 22 and 42, the lens hoods 22 and 42 may be configured to be mountable with respect to the brackets 21 and 41 by rotation around the same axes as the axes used during removal.

What is claimed is:

1. A mounting device for an imaging device including a camera unit and a light receiving unit, comprising:
   a bracket supporting the camera unit and the light receiving unit, and configured to be mounted on an attachment subject; and
   a hood having a surface expanding in a direction away from the light receiving unit in front of the light receiving unit, and mounted on the bracket so that the surface faces the attachment subject,
   wherein the hood is attached to or removed from the bracket by sliding the hood along a surface of the attachment subject while the camera unit is being supported by the bracket.

2. The mounting device according to claim 1, wherein the hood, while the camera unit is mounted on the bracket, is mounted on the bracket along a direction opposite a direction in which the hood is removed from the bracket.

3. The mounting device according to claim 2, wherein the hood further comprises:
   a hood body having a shape expanding in a direction away from the light receiving unit in front of the light receiving unit;
   a first engaging part protruding from the hood body to have a shape so as to extend along a direction in which the hood is mounted, and locking the hood body to the bracket by engaging with the bracket; and
   a second engaging part extending in a direction intersecting the first engaging part, positioned behind the first engaging part in a direction in which the hood is mounted, and locking the hood body to the bracket by engaging with the bracket.

4. The mounting device according to claim 1, wherein the hood further comprises:
   a hood body having a shape expanding in a direction away from the light receiving unit in front of the light receiving unit; and
   an engaging part protruding from the hood body and having a shape so as to extend along a direction in which the hood is removed, and locking the hood body to the bracket by engaging with the bracket.

5. The mounting device according to claim 1, wherein the bracket supports part of the camera unit on a side opposite the attachment subject with respect to the hood.

6. The mounting device according to claim 1, wherein
   the bracket is configured to guide the engaging part along the expanding surface of the hood, and
   the bracket comprises
      at least one engaging leg extending along a first direction of the bracket and aligned in a second direction of the bracket, which is orthogonal to the first direction of the bracket, with a gap therebetween and
      at least one engaging hole through which the at least one engaging leg passes.

7. The mounting device according to claim 1, wherein
   the hood further comprises a second engaging part extending along a second direction that intersects the first direction, and when the hood is mounted on the bracket in the first direction, the second engaging part is positioned behind the first engaging part in the first direction.

8. The mounting device according to claim 1, wherein
   the hood comprises
      a hood body, and
      a first engaging part projecting from the hood body and extending along a first direction in which the hood is mounted on and removed from the bracket, the first direction being orthogonal to the direction in which the surface extends, the first engaging part being configured to releasably engage with the bracket through which the hood body engages with the bracket.

* * * * *